United States Patent

Sherman et al.

[11] 3,731,149
[45] May 1, 1973

[54] ARC SUPPRESSION, MOTOR PROTECTION AND DYNAMIC BRAKING NETWORK FOR A.C. MOTORS

[75] Inventors: Lawrence V. Sherman, Kirkland; Richard A. Marson; Jack D. Keeler, both of Seattle; Edmund I. Fagan, Bellevue, all of Wash.

[73] Assignee: EMF Corporation, Seattle, Wash.

[22] Filed: Aug. 30, 1971

[21] Appl. No.: 176,099

Related U.S. Application Data

[63] Continuation-in-part of Ser. No. 9,736, Feb. 9, 1970, which is a continuation-in-part of Ser. No. 815,811, April 14, 1969.

[52] U.S. Cl..............317/11 A, 317/11 C, 317/11 E, 317/16, 307/136, 317/33 SC, 317/36 TD
[51] Int. Cl...............................................H02h 3/00
[58] Field of Search.................317/11 R, 11 A, 11 B, 317/11 C, 11 E, 16, 33 SC, 33 C, DIG. 6, 36 TD; 307/136; 200/146, 144 AP; 318/212

[56] References Cited

UNITED STATES PATENTS

| | | | |
|---|---|---|---|
| 3,330,992 | 7/1967 | Perrins | 317/11 A |
| 3,237,030 | 2/1966 | Coburn | 317/11 E |
| 3,534,226 | 10/1970 | Lian | 317/11 E |
| 3,192,440 | 6/1965 | Baltensberger | 317/11 B |
| 2,208,399 | 7/1940 | Slepian | 317/11 E |

Primary Examiner—J. D. Miller
Assistant Examiner—Harvey Fendelman
Attorney—John D. Graybeal et al.

[57] ABSTRACT

Arc suppression, motor protection, and dynamic braking network for A.C. motors. Rectifying means are used to provide positive polarity half-cycle power or interrupted pulsating current to one side of an A.C. motor. The back EMF of the motor maintains the stationary magnetic field during the negative half cycle of power in the braking circuit. The electro-inertial characteristics of sudden braking and stopping action produce power surges in the motor circuits. The network reduces arcing and thermal loading when the braking circuit is opened at the moment the motor reaches a stopped condition. It is at the instant the motor stops that maximum current is passing through the stator windings and the need for arc suppression and motor protection is greatest.

4 Claims, 9 Drawing Figures

INVENTORS
LAWRENCE V. SHERMAN
RICHARD A. MARSON
JACK D. KEELER
EDMUND I. FAGAN

BY *Graybeal, Cole & Barnard*

ATTORNEYS

INVENTORS
LAWRENCE V. SHERMAN
RICHARD A. MARSON
JACK D. KEELER
EDMUND I. FAGAN

BY *Hopybeal, Cole & Bernard*

ATTORNEYS

3,731,149

ARC SUPPRESSION, MOTOR PROTECTION AND DYNAMIC BRAKING NETWORK FOR A.C. MOTORS

CROSS-REFERENCE TO RELATED APPLICATIONS

This application is a continuation-in-part of U.S. copending patent application Ser. No. 9,736, entitled Dynamic Braking Control for A.C. Motors, filed Feb. 9, 1970, in the name of Richard A. Marson, Jack D. Keeler and Edmund I. Fagan, which in turn was a continuation-in-part of prior pending United States patent application Ser. No. 815,811, entitled Dynamic Braking Control for A.C. Motors, filed Apr. 14, 1969, in the name of Richard A. Marson, Jack D. Keeler and Edmund I. Fagan.

BACKGROUND OF THE INVENTION

A squirrel-cage motor when starting produces a similar effect on the line supply to that of a transformer with a shorted secondary. As those skilled in the art are aware, it draws from the line a very much larger current on starting than it does for running. The reason is that the rotor constitutes a short-circuited secondary winding, and except for magnetic flux leakage, has no elements tending to hold back the instantaneous flow of current beyond the resistance of the stator and rotor structures. The resistance across these windings is very small in comparison to the counter EMF, which is maximum when the motor is running at full speed. The flux leakage induces some counter EMF which tends to resist the current flow, but the amount may be only 10 to 20 percent of the line voltage. In dynamic braking, when the motor comes to a stop there is a very similar condition to that of the motor starting. At the stopped condition current is maximum in the motor windings, since the motor is no longer offering counter EMF resistance to forward current conduction.

There are presently known many types of braking systems for A.C. motors. The majority are mechanical in nature and are complicated and expensive. Mechanical brakes for A.C. motors lack reliable control characteristics and are affected by both temperature and humidity. They are also subject to wear and require frequent adjustment and replacement of parts. For larger types of motors the braking equipment can be quite large and inconvenient to install. Downtime of the brake idles production for which the A.C. motor is responsible and further adds to the cost of mechanical braking systems. Presently known dynamic braking controls utilizing D.C. power are complex, bulky, elaborate and expensive. Present dynamic brake systems also subject motors and circuit components to current and voltage transients and surges of a high order of magnitude. Arcing conditions induced and existing because of the electro-intertial characteristics in currently known dynamic braking installations produce intense and destructive arcing in switches and contacts of the interrupting elements which results in decreased life expectancy and performance of the control equipment and furthermore requires inordinately large circuit interrupting equipment. The electro-inertial properties of high current/high voltage interruptions produce power surges in the motor circuits resulting in thermal overloading and prove inherently harmful to the operation of the motor and to its life expectancy.

Among the prior art references which may be considered to be of interest but not material to the invention are the following U.S. Pat. Nos. 2,208,399; 3,223,888; 3,340,449; 3,389,301; 3,395,316; 3,412,304.

SUMMARY OF INVENTION

The invention is directed to a unique and simple arc suppression, motor protection, and dynamic braking control network for A.C. type motors. The network incorporates components in a uniquely new circuit design for developing specific functions for such A.C. type motors. Incoming power is directed through a capacitive reactance in conjunction with a rectifier so that the motor is supplied wih half-cycle A.C. power limited either to positive or negative polarity. There is in effect an interrupted pulsating D.C. input supplied to the motor which is responsible for the motor generating a back EMF. The back EMF from the motor is passed through a rectifying means so that the collapsing field of the motor maintains the current in a forward direction to continue the direct current effect which maintains the stationary magnetic field, which is essentially responsible for the braking effect. When the motor reaches a stopped condition, it exists in a "locked-rotor" condition with maximum current passing through the stator windings. Circuit interruptors are provided on each side of the capacitive reactance and open simultaneously when the motor has achieved a stopped condition. It has been found that interrupting the braking circuit simultaneously at two points on each side of the capacitor results in greatly reduced arcing and thermal loading of the motor itself.

Accordingly, it is among the many features of this invention to provide a rapid, dynamic braking system with arc suppression and motor protection. This invention applies to common A.C. motors, such as capacitor-start induction motors, split-phase motors, repulsion-induction motors, synchronous motors, shaded pole motors and other A.C. motors with the exception of universal A.C.-D.C. type motors. The invention is unique in providing braking control, arc suppression and motor protection for A.C. type motors. An important feature is provision of a reduced number of components uniquely positioned which results in efficiency, simplicity and low cost. Another feature is that the use of this system increases the duty cycles in existing equipment employing A.C. motors where many start-stop type operations must be performed and where slow-down time is part of the operating cycle involving the motor. Another feature of the invention is that it allows for the use of smaller and lower rated circuit or network components than normally required to control a specific motor. It is also a feature that this network is more versatile and thus increases the applications in which the basic braking system may be used. It is another feature that by reducing the power in some embodiments, motor use will be saved and will prevent overheating and burnout. Finally, personnel and operator safety is enhanced by lower currents and greatly reduced arcing when power tools and equipment are subjected to immediate braking.

BRIEF DESCRIPTION OF DRAWINGS

FIGS. 5 through 9 are diagrammatic representations of the circuit shown sequentially to illustrate progressively the function of the circuit; and in which FIG. 5 shows the motor in "run" mode;

FIG. 6 shows the motor "braking" condition;

FIG. 7 shows the motor at its "stopped" condition and the interrupters beginning to open;

FIG. 8 shows the interrupters open further and suppression of the arcs across the interrupter openings;

FIG. 9 shows the arc suppression and motor protection circuit at full "off".

DESCRIPTION OF PREFERRED EMBODIMENT

An arc current consists of a negative ion or electron current flowing from the negative contact member to the positive contact member and of a positive ion current flowing in the opposite direction. In an A.C. circuit the direction of flow of these currents is reversed each half cycle of the current wave. Deionization is the process of restoring an ionized gas of electrons and positive ions to its originally electrically neutral state. It is by process of deionization that the gap space between the separated contact members of a switch or circuit breaker is converted from a gaseous conductor of electricity to a gaseous insulator. In the case of a stable or continuing arc, reignition or reestablishment continues to occur after every consecutive current zero. Circuit interruption is concerned with unstable arcs in which the rate of deionization exceeds the rate of ionization.

Deionization of the arc path may progress from half cycle to half cycle of the current wave until, after a number of half cycles, complete arc extinction is achieved. On the other hand, the rate of deionization of the arc path may be so high that complete extinction is achieved at or about the time of the first natural current zero following arc extinction. The rate at which the arc path is being deionized is a most important factor and it is a general aim in the design and application of switches and circuit breakers to increase that rate as much as possible in order to accomplish rapid circuit interruption. An arc, if not definitely extinguished at the end of a half cycle of the current wave, is reestablished at the beginning of the next consecutive half cycle. The arc residue, that is, whatever amount of ionized gas still remains in the arc gap at the end of a half cycle of the current wave, may be displaced by convective or other motion. On account or because of such displacement of the arc residue, the arc may be reestablished or reignited after current zero along a somewhat different path.

In ordinary D.C. interruption of circuits there are no current zeros and current zero pauses, but in the application of dynamic braking power as in the instant case, it is not a true D.C. current. The rectified A.C. power is essentially an interrupted half cycle A.C. current. Whether or not final extinction of an A.C. arc is achieved immediately after any particular current zero depends upon whether the value of the growing dielectric strength of the arc gap exceeds the voltage being impressed upon the spark gap which tends to reestablish the flow of current.

Figure 1:
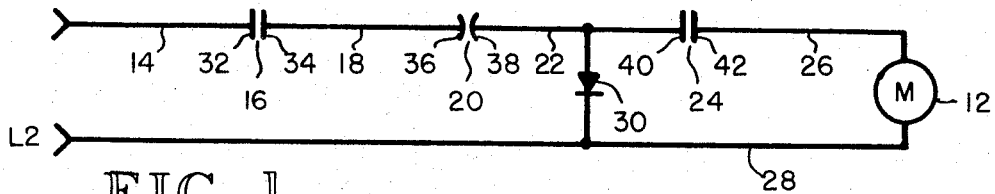
FIG. 1 shows the basic arc suppression and motor protection network in a braking circuit.

FIGS. 1 and 5 through 9 are directed to an explanation of the basic network or circuit with which the invention is concerned. FIG. 1 illustrates the basic circuit upon which numerous refinements may be made but which is common to all of the circuits hereinafter described. The circuit of FIG. 1 has motor 12 which is single phase, connected to lines $L_1$ and $L_2$. One side of the A.C. source is connected by line 14 to interrupter or switch 16. A line 18 connects interrupter 16 to capacitance 20 and line 22 connects capacitance 20 to a second interrupton 24. A line 26 connects interrupter 24 to motor 12. Another line 28 connects the motor to the other side of the A.C. power source. Rectifying diode 30 is parallel to motor 12 and is connected to line 22 between capacitance 20 and interrupter 24 and the other side of diode 30 is connected to line 28. In order to facilitate discussion relating to FIGS. 5 through 9, terminal points for the circuit components also will be identified. Thus interrupter 16 has terminal points 32 and 34, capacitance 20 has terminal points 36 and 38 and interrupter 24 has terminal points 40 and 42.

Figure 5:
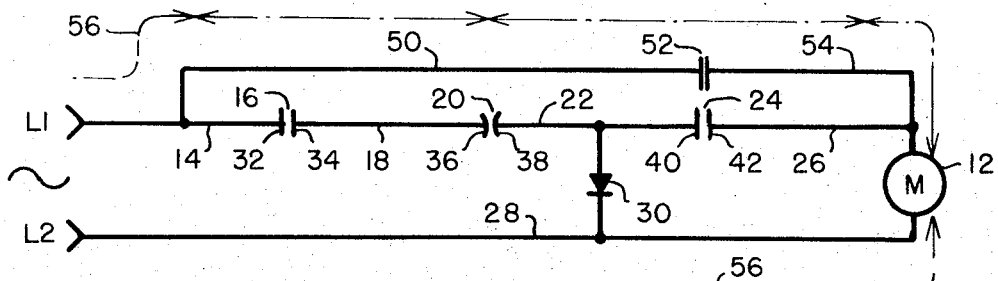

FIG. 5 shows the network operating the motor in "run" condition. A line 50 connected to one side of the AC power source contains a switch 52 connected to the motor by a line 54. Line switch 52 is closed and switches 16 and 24 are open. Thus as shown in FIG. 5 the motor is running and the A.C. current flow is as indicated by the arrowed dash-dot lines 56 around the circuit.

Figure 6:
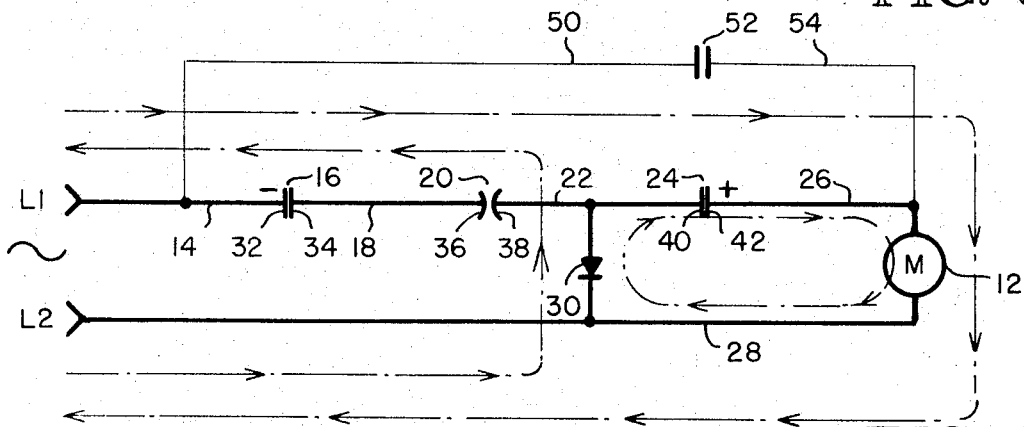

FIG. 6 shows the run circuit interrupted by opening switch 52 and the braking and arc suppression circuit energized by simultaneously closing switches 16 and 24. When contactors 16 and 24 are closed to brake motor 12, capacitance 20 passes a full A.C. wave but limits the current. Capacitive reactance 20 besides having a current limiting effect also acts as a reactance vectoring component with motor inductance to give a more efficient power factor. Since the maximum field developed in the motor for braking is a function of impressed voltage and current, the capacitive reactance braking energy is in phase with the motor inductance to produce a large back EMF.

MOTOR 12 will accept half cycle pulses of one polarity while the half cycles of opposite polarity are accepted by diode 30 and are passed on to ground. Thus the motor sees half cycle interrupted pulsating current. During the half cycle in which no current flows the motor will generate back EMF which passes through rectifying diode 30 and amounts to the motor loading itself. The principle of dynamic braking involves conversion of the kinetic energy of the spinning motor into heat energy dissipated in the resistance of the rotor. To accomplish this it is necessrary to disconnect the main winding from the A.C. source and apply a direct current to the same winding. The magnitude of the direct current voltage will determine how rapidly the motor will stop, although it should be noted that a quick stop is accomplished by a large instantaneous value of direct current. In a situation in which an AC motor is operating at normal speed and the power is switched to a direct current, a stationary magnetic field is established and this field will create the same number of poles as the normally operating motor. As the rotor conductors cut the stationary field, alternating voltages will be generated and their magnitude and frequency will be proportional at any instant of time to the rotor speed. This means that the generated voltage will be a maximum when the breaking action is initiated and zero when the motor comes to rest. Since the rotor is made of bars of copper or aluminum that are short-circuited by rings at both ends, a current will flow to produce an independent rotor field which will be stationary in space considering that it rotates at exactly the same speed as the rotor but in the opposite direction. The direction of the rotor field will operate to neutralize or weaken the direct current field established by the stator. Because the stator winding is connected to a direct current supply, or in this case a pulsating half cycle A.C., there is no power to drive the rotor and the only power delivered to the motor is that necessary to account for the direct current resistance lost in the stator windings. The heat developed in the rotor during the entire braking period is equal to the kinetic energy of the rotor at the instant the stator winding is connected to the direct current supply. The heat is also independent of the rotor resistance and the type of motor, the direct current field of the stator winding and the time required for the braking operation. In summary, the rotor gives up its energy as it slows down and comes to a full stop when the energy is completely dissipated. As stated above the braking time depends upon the magnitude of the impressed D.C. voltage. Since the motor braking action is extremely fast there is as stated above a large instantaneous value of direct current at the instant the rotor comes to a stop. Since the braking circuit is still closed the motor is still receiving half cycle A.C. pulses. Thus the thermal loading on the motor structure is substantial and it becomes desirable to interrupt the circuit as quickly as possible after stoppage to protect the motor against thermal loading and switches from the damage or arcing.

Figure 7:
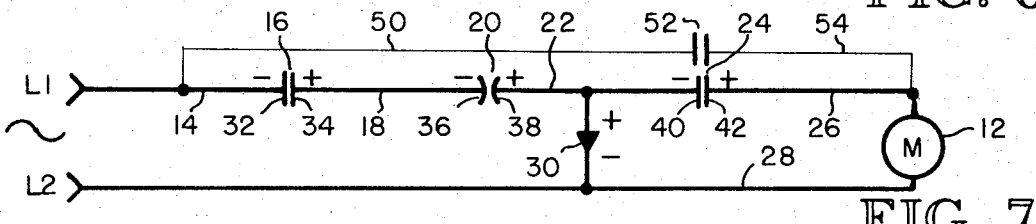
Figure 8:
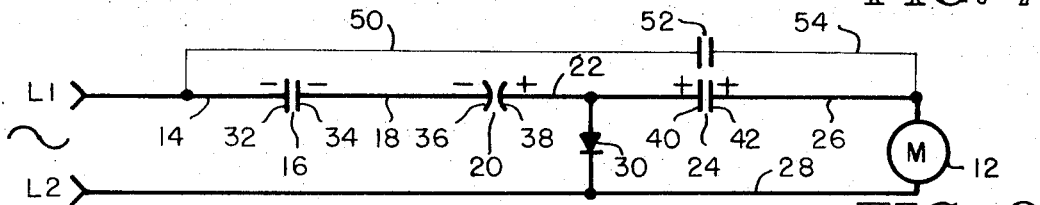
Figure 9:
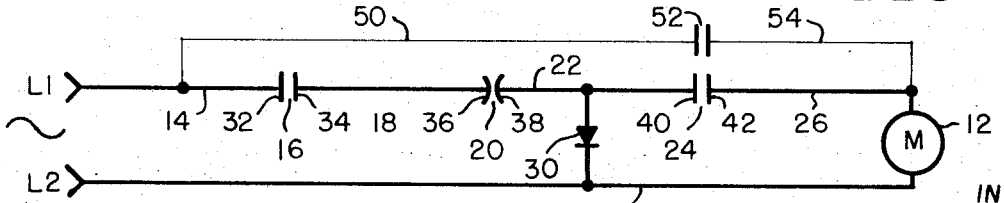

FIG. 7 shows switches 16 and 24 beginning to open and shows polarities of the terminal points as arcing takes place. FIG. 8 shows the contactors open slightly more and that there has been polarity reversal to initiate suppression the arcing. FIG. 9 shows the circuit completely open. Control of the arc reignition or reestablishment phenomena is achieved by the complete isolation and interruption of the circuit with two contactors in combination with the capacitive reactance 20 suppress the arcing so that small switch components can be employed. Those skilled in the art will appreciate that capacitor 20 aids the polarity shifting also.

The inductive power supply for braking is accomplished through capacitive-reactance 20 rectifying diode 30. When braking is complete, the motor is in a "stalled-rotor" current condition until the braking circuit is interrupted. The electro-inertial characteristics of electron flow during this condition produce an intense conduction current at terminal point 32 and an intense convection current at terminal point 40.

Terminal point 32 is negative when current flow is toward capacitive-reactance 20. Terminal point 40 is also negative with the flow of current towards terminal point 42, but point 40 is positive with respect to terminal point 32 and reactance 20 until circuit interruption. During circuit interruption the current flow tends to maintain the ionized polarites until arc extinguishing is complete. Switching element 16, however, operating in conjunction with switching element 24 interrupts the flow of current at points 32 and 42 causing a relative change in the polarities of points 34 and 40. Terminal point 38 was positive relative to terminal point 32 and terminal point 40 was negative relative to point 42. During interruption when the arc is being extinguished due to deionization as an effect of contact gap separation, the shift in polarity results from the transition in current interruption from current flow to a static condition and thus the removal of polarity potentials at points 32 and 42. Reversal of the polarities places the flow of ione in the arc in an environment in which they are repelled. Arc suppression takes place when repelling polarities are developed in the ionization path. Reactance 20 is negative relative to terminal point 40 and this results in polarity changes at terminal points 36, 38, and 40. Reactance 20 is now negative at point 36 to point 34 which is also negative and point 40 is now positive with respect to a positive point 42. The overall effect of the shift or reversals in polarities is an accelerated extinguishing of the existing arc and constitutes an effective suppressor. FIG. 9 shows all interrupters at the full open position so that both the running and braking circuits are open. As soon as the polarity reversals develop then extinguishing of arcing begins and thus contactors 16 and 24 will not have reached their full open position as is suggested by FIG. 8. The use of a single interrupter in a basic network requires a substantial switch to withstand the substantial arcing incurred. The particular network described herein gives more efficient braking, reduces thermal loading on the motor and suppresses arcing by as much as 40 to 50 percent of what would normally be occuring.

Figure 2:
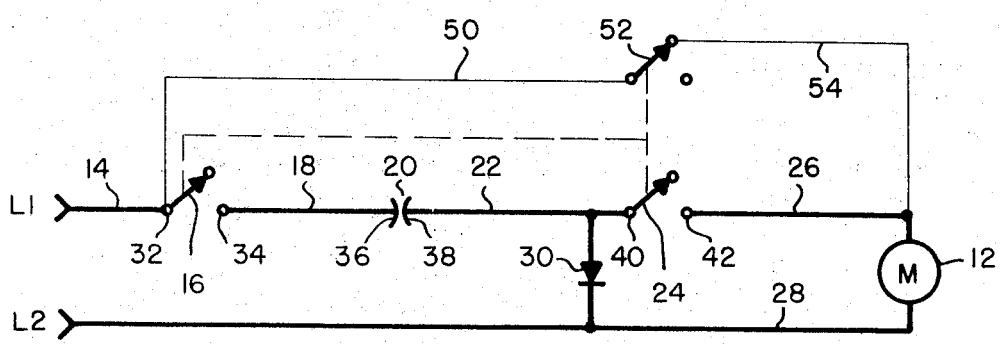
FIG. 2 shows the basic network and circuit for manual operation using a three-pole double switch and in which interrupting the circuit and network is manual.

FIG. 2 shows a manually operated circuit which could be used with motors which can be started with across-the-line current.

Some arcing will occur on completion of braking and therefore even with manually operated circuits application of the inventive network is desirable.

Figure 3:
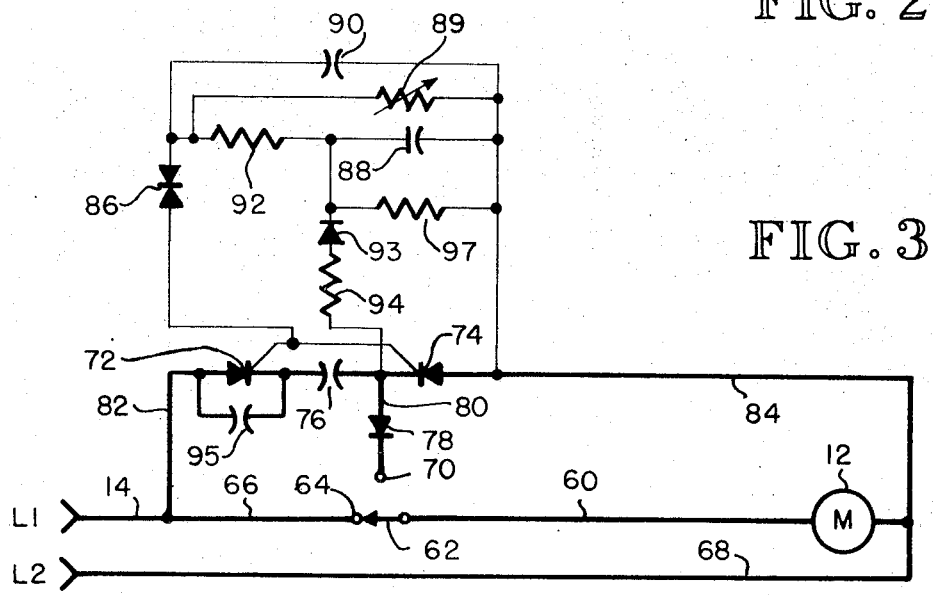
FIG. 3 represents an automatic time delay circuit with SCR's operating as interrupters.

FIG. 3 shows an automatic time delay employing solid state SCR contactors. Motor 12 is connected to one side of the A.C. source by line 60, switch 62, contact 64 and line 66. The circuit is completed to the other side of the A.C. source by line 68. In the braking mode switch 62 is moved to contact 70 to open the run circuit and apply the arc suppression and braking circuit. SCR's 72 and 74 are in series with capacitance 76 and rectifying diode 78 is connected between line 60, switch 62, contact 70, line 80 which in turn is connected between capacitance 76 and SCR 74. The network is completed by line 82 connecting SCR 72 to one side of the A.C. source and line 84 connecting SCR 74 with one side of the motor. The solid state interrupters or SCR's 72 and 74 are triggered to conduct simultaneously by diac 86. Time capacitor 88 when discharged turns diac 86 off. When diac 86 is on the SCR's 72 and 74 are triggered and can conduct. However, when the disc 86 is off then the solid state switches are blocking and effectively interrupting the braking and arc suppression circuit. Such a circuit will interrupt within approximately a half cycle of the instant the motor reaches a stopped condition. Timing capacitor 88 is charged when the switch 82 is in motor run position. Timing capacitor 88 receives its charging current through circuit pathway 68 via 84-into timing capacitor 88 through rectifier 93 and current limiter 94 and connecting to A.C. source 82 via capacitive reactance 95. When the switch 62 is in brake/off mode, the capacitive reactance 95 is connected through low-resistance circuit composed of capacitive reactance 76, rectifying dode 78, switch 62, and motor 12 to line 68. The low-resistance network of brake/off mode prevents the timing capacitor 88 from being charged. Resistance 91 acts to discharge any residual current in the timing capacitor 88. Resistance 92 limits the buffer current to diac 86. Variable resistance 89 adjusts the rate of discharge of timing capacitor 88 by shunting the discharge current from the diac 86 trigger circuit. Capacitor 90 serves to keep a stable voltage on the diac 86 to prevent sporadic triggering of the SCR's 72 and 74. Other timing circuits may be designed but it is desired to show one form of automatic timing for interrupting the braking and arc suppression circuit which would be used for braking larger capacity motors. It will be appreciated that with dual solid state switching devices as shown polarity reversals still take place and thus reduce the loads on the SCR's which would tend to produce secondary breakdown.

Figure 4:
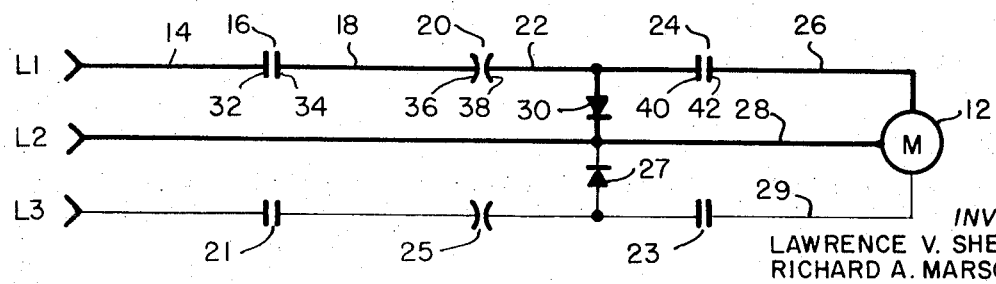
FIG. 4 represents the basic circuit and network in application to a three-phase motor.

FIG. 4 shows application of the principles of this invention to either two legs or all three legs of a three phase motor. In this case contactors 21 and 23 are placed in series in the third leg of the motor circuit with capacitive reactance 25 and with diode 27 interconnecting and 28 and the third leg between capacitance 25 and interrupter 23.

It will be appreciated that the capacitive reactance may be several capacitors in parallel or series or combinations of both but in the position indicated in the basic network. Multiple capacitors may be sequentially controlled to give a variable reactance.

What is claimed is:

1. Arc suppression, motor protection and dynamic braking network for A. C. motors having at least first and second power source lines, comprising,
   a. first interrupter means in at least one of said power lines for interrupting full line power to the motor,
   b. conduit means parallel to said first interrupter means and shunted around the same between said one of said power lines and said motor, c. rectifying means parallel to said motor and interconnecting the other of said power lines and said conduit means,
   d. second interrupter means located in said conduit between connection of said conduit to said power line and connection of said rectifying means to said conduit,
   e. third interrupter means located in said conduit between said motor and connection of said rectifying means to said conduit,
   f. capacitive reactance located in said conduit between said second interrupter means and connection of said rectifying means to said conduit, and
   g. said second and third interrupter means being designed to conduct and interrupt the network substantially instantaneously to achieve circuit isolation of said network and suppress arcing as said motor reaches a stopped condition.

2. The network according to claim 1 and wherein said second and third interrupters are electro-mechanical switches.

3. Arc suppression, motor protection and dynamic braking network for A. C. motors having at least first and second power lines comprising: a. first interrupter means in at least one of said power lines for interrupting full line power to the motor,
   b. conduit means parallel to said first interrupter means and shunted around the same between said one of said power lines and one side of said motor,
   c. rectifying means parallel to said motor and interconnecting the other of said power lines and said conduit means, said rectifying means providing said motor with pulses of one polarity,
   d. second interrupter means located in said conduit between connection of said conduit to said power line and connection of said rectifying means to said conduit,
   e. third interrupter means located in said conduit between said motor and connection of said rectifying means to said conduit,
   f. capacitive reactance located in said conduit between second interrupter means and connection of said rectifying means to said conduit, and
   g. said second and third interrupter means being designed to conduct and interrupt the network substantially instantaneously to achieve circuit isolation of said network and suppress arcing and interrupter loading as said motor reaches a stopped condition.

4. The network according to claim 3 and wherein said second and third interrupters are electro-mechanical switches.

* * * * *